Aug. 11, 1953     F. BUDRECK     2,648,556
REAR-VISION MIRROR MOUNTING STRUCTURE
OF THE UNIVERSAL TYPE
Filed Dec. 9, 1950     2 Sheets-Sheet 1
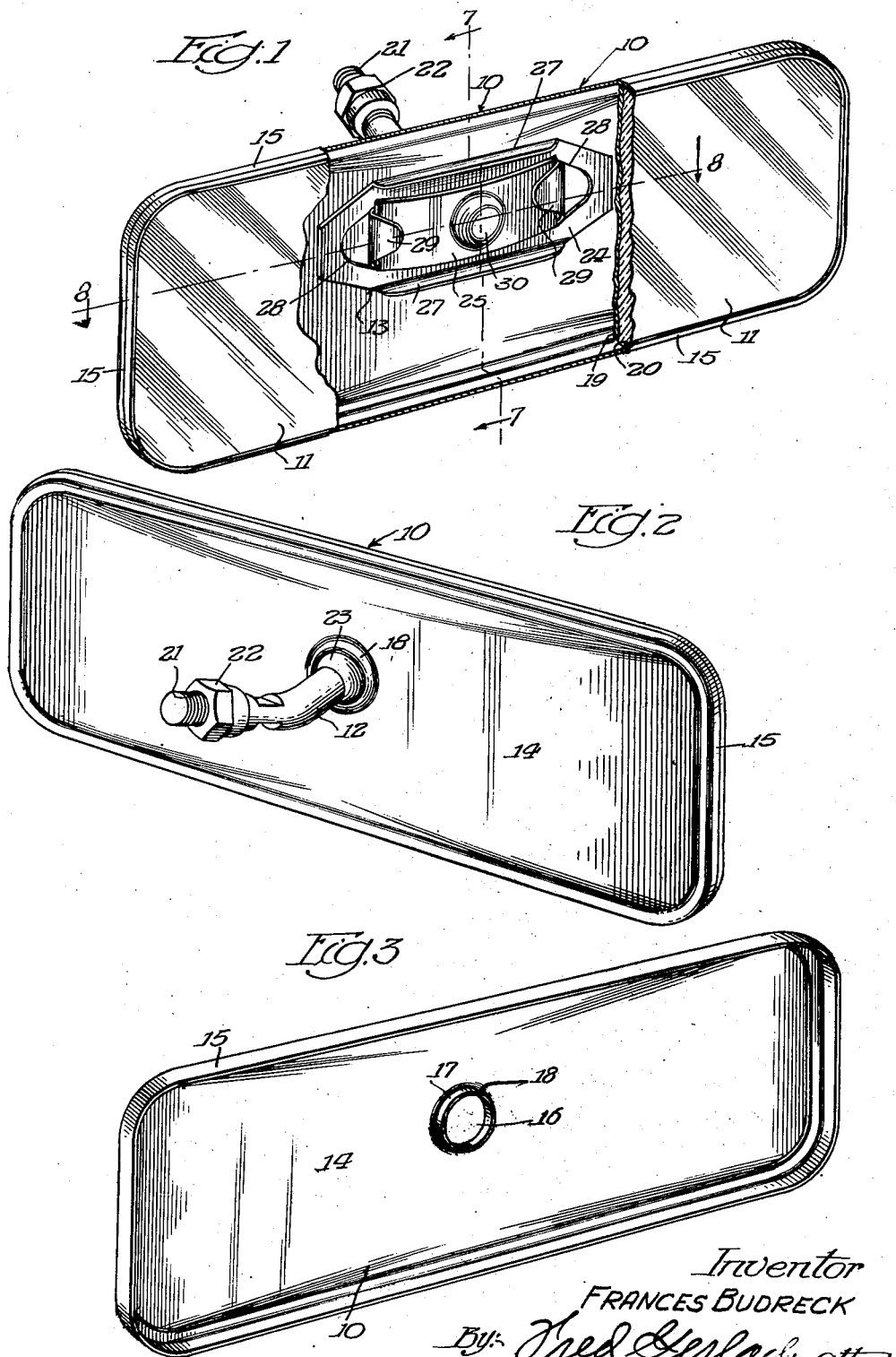
Inventor
FRANCES BUDRECK Aug. 11, 1953
F. BUDRECK
2,648,556
REAR-VISION MIRROR MOUNTING STRUCTURE
OF THE UNIVERSAL TYPE
Filed Dec. 9, 1950
2 Sheets-Sheet 2
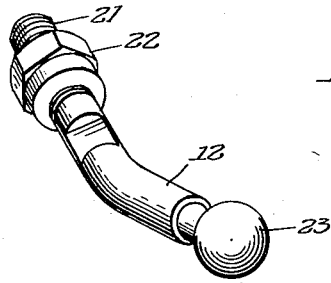
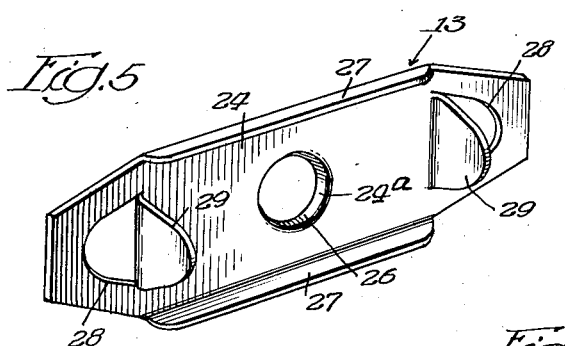
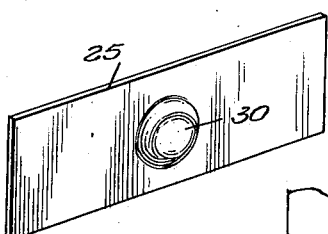
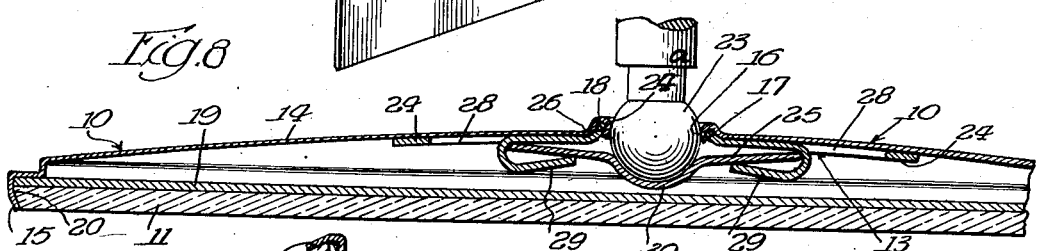
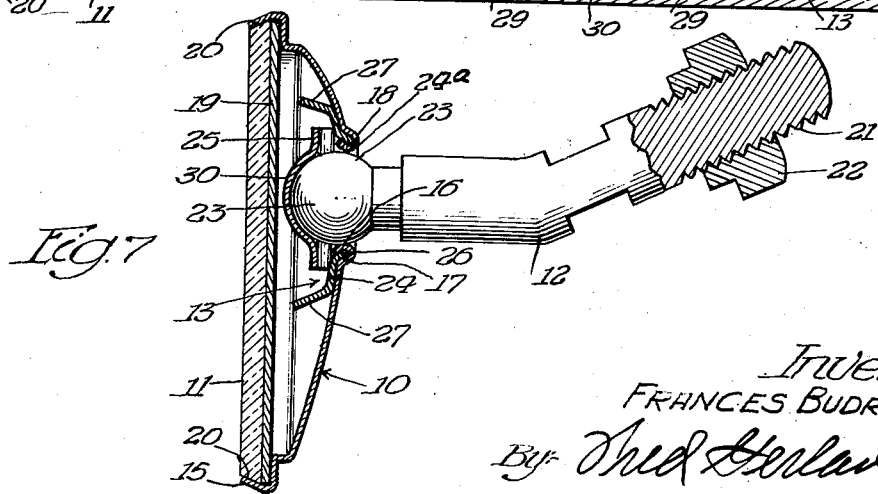
Inventor
FRANCES BUDRECK Patented Aug. 11, 1953

2,648,556

UNITED STATES PATENT OFFICE 2,648,556

REAR-VISION MIRROR MOUNTING STRUCTURE OF THE UNIVERSAL TYPE

Frances Budreck, Chicago, Ill., assignor to Monarch Tool & Machinery Co., Chicago, Ill., a corporation of Illinois Application December 9, 1950, Serial No. 200,059

8 Claims. (Cl. 287—21)

The present invention relates generally to rear vision mirrors. More particularly the invention relates to that type of rear vision mirror which is adapted to be mounted adjacent the upper portion of the windshield of an automobile or other vehicle, serves as a medium or instrumentality for enabling the driver to view objects behind the automobile and comprises as its principal components or parts: (1) a shallow horizontally elongated cup-shaped shell which is in the form of a sheet metal stamping and consists of a rearwardly dished rear wall with a circular hole in its upper central portion and a continuous forwardly extending side wall; (2) a mirror plate which is shaped conformably to, and fits within, the side wall of the shell; (3) a mounting arm which is disposed behind the shell, extends lengthwise of the automobile, embodies at its rear end means whereby it may be fixedly connected to the automobile at a point adjacent the upper portion of the windshield, and has the front end thereof disposed adjacent the hole in the shell and provided with a fixed ball shaped member within the hole; and (4) a mounting unit which is connected to the upper central portion of the rear wall of the shell, forms a socket in which the ball shaped member is disposed and coacts with such member to form a universal joint whereby the shell may be angularly adjusted in order to bring the mirror plate into the proper line of vision of the driver.

In a rear vision mirror of the aforementioned type it has heretofore been proposed to employ as the socket forming mounting unit a pair of oppositely disposed complemental sheet metal stampings. It has also been proposed to connect the stampings to the rear wall of the shell by way of a plurality of rivets which extend transversely through aligned holes in the stampings and the shell rear wall. In practice it has been found that a rear vision mirror, the mounting unit of which consists of two complemental oppositely disposed sheet metal stampings which are secured in place by rivets, is subject to several objections. In the first place, the portions of the rivets that are exteriorly disposed with respect to the shell are unsightly; secondly, the rivet holes in the rear wall of the shell weaken the shell to an appreciable extent; and thirdly, the rivet holes in the two stampings and the rear wall of the shell permit, in connection with loosening of the rivets, moisture to collect in the shell interior and cause rusting of the shell.

One object of this invention is to provide a rear vision mirror which is an improvement upon, and eliminates the objections to, previously designed mirrors and is characterized by the fact that the socket forming mounting unit which surrounds and forms a socket for the ball shaped member on the front end of the mounting arm is so constructed and designed that it effectively fulfills its intended purpose without requiring the use of rivets to secure it in connected relation with the upper central portion of the rear wall of the shell. By eliminating the use of rivets the rear wall of the shell is not weakened and the possibility of moisture accumulating within the shell is materially reduced.

Another object of the invention is to provide a rear vision mirror of the aforementioned type in which the mounting unit comprises a rearwardly disposed stamped metal bracket-like plate which fits against the upper central portion of the inner face of the rear wall of the shell and has a circular hole in registry with the hole in the shell rear wall, and the shell rear wall has around its hole an integral forwardly extending annular flange which extends through the hole in the bracket-like plate and has its front end bent outwards into interlocked relation with the hole defining portion of the plate in order fixedly to secure the plate in place and form an annular seat for the rear portion of the ball shaped member on the front end of the mounting arm.

Another object of the invention is to provide a rear vision mirror of the last mentioned type and character in which the mounting unit also comprises a forwardly disposed spring metal strip, the central portion of which is forwardly deformed to form a curved or arcuate recess for the front portion of the ball shaped member on the front end of the mounting arm, and the end portions of which are connected to the rearwardly disposed stamped metal bracket-like plate by way of integral forwardly extending L-shaped tongues on the plate.

A further object of the invention is to provide a rear vision mirror of the type and character under consideration in which the L-shaped tongues on the bracket-like plate of the mounting unit are so arranged or designed that they cause the end portions of the spring metal strip that constitutes the other part of the mounting unit to be flexed rearwards to the end that the recessed central portion of the strip grips the front portion of the ball shaped member with spring pressure.

A still further object of the invention is to provide a rear vision mirror which is generally of new and improved construction, effectively and efficiently fulfills its intended purpose and is capable of being produced at a comparatively low cost.

Other objects of the invention and the various advantages and characteristics of the present rear vision mirror will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a front perspective of a rear vision mirror embodying the invention, certain portions of the mirror plate being broken away and other portions being shown in section for purposes of illustration;

Figure 2 is a rear perspective view of the mirror;

Figure 3 is a front perspective view of the shallow horizontally elongated cup-shaped shell;

Figure 4 is a front perspective view of the mounting arm, the front end of which is provided with a fixed ball shaped member which coacts with the mounting unit to form a universal joint whereby the shell together with the mirror plate may be tilted into different angular position with respect to the arm;

Figure 5 is a front perspective view showing the stamped metal bracket-like plate before inward bending of the outer portions of its L-shaped tongues for purposes of securing in place the spring metal strip;

Figure 6 is a front perspective view of the spring metal strip;

Figure 7 is a vertical section taken on the line 7—7 of Figure 1 and illustrating in detail the manner in which the bracket-like plate constituting one of the two parts of the mounting unit is fixedly secured against the inner face of the rear wall of the shell by way of the integral forwardly extending annular flange around the hole in the shell rear wall; and Figure 8 is a horizontal section taken on the line 8—8 of Figure 1 and showing the construction and arrangement of the L-shaped tongues on the bracket type plate and the manner in which they serve to hold the end portions of the spring metal strip flexed rearwards so that the recessed central portion of the strip grips the front portion of the ball shaped member on the front end of the mounting arm with spring pressure.

The rear vision mirror which is shown in the drawings constitutes the preferred form or embodiment of the invention. It is adapted to be mounted adjacent the upper portion of the windshield of an automobile or other vehicle and when properly positioned or adjusted enables the driver of the automobile to view objects in the rear. As its components the mirror comprises a shell 10, a mirror plate 11, a mounting arm 12, and a mounting unit 13. These parts when in assembled relation constitute a unitary structure.

The shell 10 of the rear vision mirror is in the form of a one-piece stamping of light gauge sheet metal and consists of a rear wall 14 and a continuous side wall 15. It is substantially rectangular and serves as a support and partial housing for the mirror plate 11. The rear wall 14 of the shell is rearwardly dished to a comparatively small extent in order that it is slightly concavo-convex. In the upper central portion of the rear wall is a circular hole 16 and this is surrounded and defined by a forwardly extending annular flange 17. The front end of the flange is free and the rear end is connected to, and formed integrally with, the inner marginal portion of a rearwardly facing annular bead 18 on the upper central portion of the rear wall 14 of the shell 10. Except for the circular hole 16 the shell rear wall 14 is imperforate. The continuous side wall 15 of the shell is connected to, and projects forwards from, the outer marginal portion of the rear wall 14 and is imperforate throughout.

The mirror plate 11 is shaped conformably to, and fits within, the continuous side wall 15 of the shell 10. It is of conventional design or construction and consists of a piece of glass and a silver variety coating on the rear or inner surface of the glass piece. Directly behind the mirror 11 is a resilient or cushion variety backing strip 19. This strip is the same in shape as the mirror and has the outer marginal portion thereof in abutment with the outer marginal portion of the shell rear wall 14. The front marginal portion of the continuous side wall 15 of the shell is bent inwards and coacts with a bevel 20 on the edge of the mirror plate securely to hold such plate in place. The mirror plate 11 constitutes a medium or instrumentality whereby the driver of the automobile to which the mirror as a whole is applied is permitted to view objects behind the automobile.

The mounting arm 12 is located or disposed directly behind the shell, is adapted to extend lengthwise of the vehicle and is formed of steel or any other suitable metal. It embodies at its rear end a screw thread 21 and a nut 22 whereby it may be fixedly connected to the automobile at a point adjacent the upper portion of the windshield. The front end of the mounting arm 12 is located adjacent the upper central portion of the rear wall 14 of the shell and shaped to form a ball shaped member 23. The latter is disposed for the most part within the interior of the shell 10 and has the rear portion thereof in slidably seated relation with the front end of the annular flange 17 that extends around and defines the hole 16. In assembling the mirror the mounting arm 12 before application of the nut 22 to the screw thread 21 is shifted rearwards through the hole 16 until the rear portion of the ball shaped member 23 seats against the front end of the annular flange 17. Thereafter the nut 22 is applied to the screw thread 21 and this is later followed by mounting the mirror plate 11 with its backing strip 19 within the continuous side wall 15 of the shell 10.

The mounting unit 13 is disposed wholly within the interior of the shell 10 and coacts with the ball shaped member 23 on the front end of the mounting arm 12 to form a universal joint whereby the shell 10 may be angularly adjusted in order to bring the mirror plate 11 into the line of vision of the driver of the automobile to which the mirror as a whole is applied. It is of two-piece character and comprises a rearwardly disposed stamped metal bracket-like plate 24 and a forwardly disposed spring metal strip 25. The plate 13 is stamped from sheet metal of heavier gauge than the shell 10 and is horizontally elongated. It fits against the inner face of the upper central portion of the shell rear wall 14 and has in the central portion thereof a circular hole 24ª in registering or coaxial relation with the circular hole 16. The hole defining portion of the bracket-like plate 24 is bent rearwards and forms a rearwardly extending annular flange 26 which fits within the interior of the rearwardly extending annular bead 18, and coacts with the bead to hold the bracket-like plate against lateral displacement with respect to the rear wall of the shell (see Fig. 7). The flange 26 also serves in connection with assembly of the mirror as a piloting medium for properly positioning the plate 24 with respect to the rear wall of the shell. The front end of the annular flange 17 is bent outwards into interlocked relation with the annular flange 26 in order fixedly to secure the bracket-like plate 24 in place against the inner face of the upper central portion of the shell side wall 14. As clearly shown in the drawings the diameter of the ball shaped member 23 on the front end of the mounting arm 12 is greater than the diameter of the hole 16. By securing the bracket-like plate 24 in place by way of the annular flange 17 the use of unsightly rivets or like attaching devices is avoided. The upper and lower marginal portions of the plate 24 are bent forwards in order to form flanges 27 for reenforcing the plate against longitudinal bending or distortion. The end portions of the bracket-like plate 24 have formed therein oppositely disposed C-shaped slits 28. The portions of the plate within the slits are bent forwards and then inwards to form integral L-shaped tongues 29 which, as hereinafter described, serve as anchoring or securing means for the spring metal strip 25. Such strip is rectangular and extends horizontally. It is located directly in front of the central portion of the bracket-like plate 24 and has its central portion forwardly deformed to form a groove or arcuate recess 30 for the front portion of the ball shaped member 23 on the front end of the mounting arm 12. The end portions of the spring metal strip 25 fit against the front faces of the inwardly extending parts of the L-shaped tongues 29 and are held in place as the result of the tongues being in hooked relation with them. The tongues are so arranged and designed that they cause the end portions of the spring metal strip to be flexed rearwards to the end that the recessed central portion of the strip grips or engages the front portion of the ball shaped member 23 with spring pressure. In assembling the mirror the bracket-like plate 24 is first mounted in place. This is accomplished by placing it against the inner face of the upper central portion of the shell rear wall and then bending outwards the front end of the flange 17 so that it is in interlocked relation with the annular flange 26. The plate is mounted in place before the free end parts of the tongues 29 are bent inwards. After mounting of the plate 24 the spring metal strip 25 is positioned so that its recessed central portion engages the front portion of the ball shaped member 23 and its end portions are disposed directly inwards of the forwardly extending parts of the tongues 29. After so positioning the strip 25 the free end parts of the tongues are bent inwards into hooked relation with the end portions of the strip. The free end parts of the tongues are so bent that when in their fully bent position wherein they extend inwards they cause the end portions of the strip 25 to be flexed rearwards as shown in Figure 8 of the drawings. When the mounting unit 13 is in its assembled position the ball shaped member 23 on the front end of the mounting arm 12 is gripped between the front end of the annular flange 17 and the recessed central portion of the spring metal strip 25 and forms with them a universal joint whereby the shell together with the mirror plate may be tilted laterally or up or down into different angular positions. By reason of the fact that the end portions of the strips are held in a rearwardly flexed position by way of the L-shaped tongues 29 the recessed central portion of the strip grips the front portion of the ball shaped member with sufficient pressure that the shell tends to remain in the various angular positions into which it is adjusted.

The herein described rear vision mirror is essentially simple in design or construction and hence may be manufactured at an extremely low cost. It effectively and efficiently fulfills its intended purpose and is characterized by the fact that the mounting unit 13 is secured in place without the use of rivets or like attaching devices. Because of the construction and design of the mounting unit 13 such unit may be assembled readily.

The invention is not to be understood as restricted to the details set forth since these may be modified within the scope of the appended claims without departing from the spirit and scope of the invention.

Having thus described the invention what I claim as new and desire to secure by Letters Patent is:

1. A rear vision mirror mounting structure comprising a shallow cup-shaped shell adapted to retain a mirror plate, formed of stamped sheet metal, embodying a rear wall and having a circular hole in a portion of its rear wall, and having as an integral part of its rear wall and around the hole a forwardly extending annular flange with the front end thereof bent outwards, a bracket-like plate fitting against the inner face of said portion of the shell rear wall, provided in its central portion with a circular hole in registry with the hole in the shell rear wall, and having its hole defining portion positioned directly behind, and in interlocked relation with, the outwardly bent front end of said annular flange, a rearwardly extending mounting arm disposed behind the shell, embodying attaching means at its rear end, and having the front end thereof disposed adjacent the two holes and provided with a ball shaped member that is disposed for the most part in the shell interior and has its rear portion in slidably seated relation with said outwardly bent front end of the annular flange, and an element disposed in front of the bracket-like plate, having a portion thereof in sliding engagement with the front portion of the ball shaped member and forming with the latter and said front end of the annular flange a universal joint whereby the shell together with the mirror plate may be angularly adjusted, and having other of its portions connected to the bracket-like plate.

2. A rear vision mirror mounting structure comprising a shallow cup-shaped shell adapted to retain a mirror plate, formed of stamped sheet metal, embodying a rear wall and having a circular hole in a portion of its rear wall, and having as an integral part of its rear wall and around the hole a forwardly extending annular flange with the front end thereof bent outwards, a horizontally elongated one-piece stamped metal bracket-like plate fitting against the inner face of said portion of the shell rear wall, provided in its central portion with a circular hole in registry with the hole in the shell rear wall, and having its hole defining portion positioned directly behind, and in interlocked relation with, the outwardly bent front end of said annular flange, a rearwardly extending mounting arm disposed behind the shell, embodying at its rear end attaching means, and having the front end thereof disposed adjacent the holes and provided with a ball shaped member that is disposed for the most part in the shell interior and has its rear portion in slidably seated relation with said outwardly bent front end of the annular flange, and an elongated element disposed in front of, and in substantially parallel relation with, the bracket-like plate, having its central portion abutting against, and in sliding engagement with, the front portion of the ball shaped member and forming with the latter and said front end of the annular flange a universal joint whereby the shell together with the mirror plate may be angularly adjusted, and having its end portions connected to the end portions of said bracket-like plate.

3. A rear vision mirror mounting structure comprising a shallow cup-shaped shell adapted to retain a mirror plate, formed of stamped sheet metal, embodying a rear wall and having a circular hole in a portion of its rear wall, and having around the hole a forwardly extending annular flange with the front end thereof bent outwards and also a hollow rearwardly extending annular bead located directly outwards of, and joined to, the rear end of the flange, a one-piece stamped metal bracket-like plate fitting against the inner face of said portion of the shell rear wall, provided in its central portion with a circular hole in registry with the hole in the shell rear wall, and having its hole defining portion bent rearwards so that it lies directly behind, and in interlocked relation with, the outwardly bent front end of said annular flange and also extends into, and interfits with, said annular bead, a rearwardly extending mounting arm disposed behind the shell, embodying at its rear end attaching means, and having the front end thereof disposed adjacent the holes and provided with a ball shaped member that is disposed for the most part in the shell interior and has its rear portion in slidably seated relation with said outwardly bent front end of the annular flange, and an element disposed in front of the bracket-like plate, having a portion thereof in sliding engagement with the front portion of the ball shaped member and forming with the latter and said front end of the annular flange a universal joint whereby the shell together with the mirror plate may be angularly adjusted, and having other of its portions connected to the bracket-like plate.

4. A rear vision mirror mounting structure comprising a shallow cup-shaped shell adapted to retain a mirror plate, formed of a one-piece sheet metal stamping, embodying a rear wall and having a circular hole in the upper central portion of its rear wall, and having around the hole a forwardly extending annular flange with the front end thereof bent outwards and also a hollow rearwardly extending annular bead located directly outwards of, and joined to, the rear end of the flange, a horizontally elongated one-piece stamped metal bracket-like plate fitting against the upper central portion of the inner face of the shell rear wall, provided in its central portion with a circular hole in registry with the hole in the shell rear wall, and having its hole defining portion bent rearwards so that it lies directly behind, and in interlocked relation with, the outwardly bent front end of said annular flange and also extends into, and interfits with, said annular bead, a rearwardly extending mounting arm disposed behind the shell, embodying at its rear end attaching means, and having the front end thereof disposed adjacent the two holes and provided with a ball shaped member that is disposed for the most part in the shell interior and has its rear portion in slidably seated relation with said outwardly bent front end of the annular flange, and an elongated element disposed in front of, and in substantially parallel relation with, the bracket-like plate, having its central portion abutting against, and in sliding engagement with, the front portion of the ball shaped member and forming with the latter and said front end of the annular flange a universal joint whereby the shell together with the mirror plate may be angularly adjusted, and having its end portions connected to the end portions of the bracket-like plate.

5. A rear vision mirror mounting structure comprising a shallow cup-shaped shell adapted to retain a mirror plate, embodying a rear wall and having a hole in a portion of its rear wall, an elongated bracket-like plate fitting against the inner face of said portion of the shell rear wall, connected fixedly to said rear wall, provided in its central portion with a circular hole in registry with the hole in the shell rear wall, having means around its hole forming an annular seat, and embodying at its end portions forwardly extending L-shaped tongues with the free end parts thereof extending towards one another, a rearwardly extending mounting arm disposed behind the shell, embodying at its rear end attaching means, and having the front end thereof disposed adjacent the two holes and provided with a ball shaped member that is disposed for the most part in the shell interior and has its rear portion in slidably seated relation with said annular seat, and an elongated spring metal strip disposed in front of, and in substantially parallel relation with, the bracket-like plate, having its central portion abutting against, and in sliding engagement with, the front portion of the ball shaped member and forming with the latter and said annular seat a universal joint whereby the shell together with the mirror plate may be angularly adjusted, and having its end portions fitting behind said free end parts of the L-shaped tongues and held by said tongues so that they are rearwardly flexed and cause the central portion of the strip to bear against said front portion of the ball shaped member with spring pressure.

6. A rear vision mirror mounting structure comprising a shallow cup-shaped shell adapted to retain a mirror plate, embodying a rear wall and having a hole in a portion of its rear wall, an elongated one-piece stamped metal bracket-like plate fitting against the inner face of said portion of the shell rear wall, connected fixedly to said rear wall, provided in its central portion with a circular hole in registry with the hole in the shell rear wall, having means around its hole forming an annular seat, and embodying at its end portions integral forwardly extending L-shaped tongues with the free end parts thereof extending towards one another, a rearwardly extending mounting arm disposed behind the shell, embodying at its rear end attaching means, and having the front end thereof disposed adjacent the two holes and provided with a ball shaped member that is disposed for the most part in the shell interior and has its rear portion in slidably seated relation with said annular seat, and an elongated spring metal strip disposed in front of, and in substantially parallel relation with, the bracket-like plate, having its central portion provided with a rearwardly facing arcuate recess in sliding engagement with the front portion of the ball shaped member and forming with the latter and said annular seat a universal joint whereby the shell together with the mirror plate may be angularly adjusted, and having its end portions extending behind said free end parts of the L-shaped tongues and held by said tongues so that they are rearwardly flexed and cause the recessed central portion of the strip to bear against said front portion of the ball shaped member with spring pressure.

7. A rear vision mirror mounting structure comprising a shallow cup-shaped shell adapted to retain a mirror plate, formed of stamped sheet metal, embodying a rear wall and having a circular hole in a portion of its rear wall, and having as an integral part of its rear wall and around the hole an integral forwardly extending annular flange with the front end thereof bent outwards, an elongated bracket-like plate fitting against the inner face of said portion of the shell rear wall, provided in its central portion with a circular hole in registry with the hole in the shell rear wall, having its hole defining portion positioned directly behind, and in interlocked relation with, the outwardly bent front end of said annular flange, and embodying at its end portions forwardly extending L-shaped tongues with the free end parts thereof extending towards one another, a rearwardly extending mounting arm disposed behind the shell, embodying at its rear end attaching means, and having the front end thereof disposed adjacent the two holes and provided with a ball shaped member that is disposed for the most part in the shell interior and has its rear portion in slidably seated relation with said outwardly bent front end of the annular flange, and an elongated spring metal strip disposed in front of, and in substantially parallel relation with, the bracket-like plate, having its central portion abutting against, and in sliding engagement with, the front portion of the ball shaped member and forming with the latter and said front end of the annular flange a universal joint whereby the shell together with the mirror plate may be angularly adjusted, and having its end portions extending behind said free end parts of the L-shaped tongues and held by said tongues so that they are rearwardly flexed and cause the central portion of the strip to bear against said front portion of the ball shaped member with spring pressure.

8. A rear vision mirror mounting structure comprising a shallow cup-shaped shell adapted to retain a mirror plate, formed of stamped sheet metal, embodying a rear wall and having a circular hole in a portion of its rear wall, and having around the hole a forwardly extending annular flange with the front end thereof bent outwards and also a hollow rearwardly extending annular bead located directly outwards of, and joined to, the rear end of the flange, an elongated bracket-like plate fitting against the inner face of said portion of the shell rear wall, provided in its central portion with a circular hole in registry with the hole in the shell rear wall, having its hole defining portion bent rearwards so that it lies directly behind, and is in interlocked relation with, the outwardly bent front end of said annular bead, and embodying at its end portions forwardly extending L-shaped tongues with the free end parts thereof extending towards one another, a rearwardly extending mounting arm disposed behind the shell, embodying at its rear end attaching means, and having the front end thereof disposed adjacent the holes and provided with a ball shaped member that is disposed for the most part in the shell interior and has its rear portion in slidably seated relation with said outwardly bent front end of the annular flange, and an elongated spring metal strip disposed in front of, and in substantially parallel relation with, the bracket-like plate, having its central portion abutting against and in sliding engagement with, the front portion of the ball shaped member and forming with the latter and said front end of the annular flange a universal joint whereby the shell together with the mirror plate may be angularly adjusted, and having its end portions extending behind said free end parts of the L-shaped tongues and held by said tongues so that they are rearwardly flexed and cause the central portion of the strip to bear against said front portion of the ball shaped member with spring pressure.

FRANCES BUDRECK.

References Cited in the file of this patent

UNITED STATES PATENTS

| Number | Name | Date |
| --- | --- | --- |
| 2,089,463 | Ritz-Woller | Aug. 10, 1937 |
| 2,091,203 | Hay | Aug. 24, 1937 |
| 2,104,099 | Ponce | Jan. 4, 1938 |
| 2,112,656 | Ponce | Mar. 29, 1938 |
| 2,161,433 | Ritz-Woller | June 9, 1939 |